(No Model.)

E. P. BODEN.
TREE OR VINE PULLER.

No. 599,217.      Patented Feb. 15, 1898.

Witnesses,

Inventor,
Edmund P. Boden
By Dewey & Co.
Attys

UNITED STATES PATENT OFFICE.

EDMUND P. BODEN, OF SANTA CLARA, CALIFORNIA.

TREE OR VINE PULLER.

SPECIFICATION forming part of Letters Patent No. 599,217, dated February 15, 1898.

Application filed November 4, 1897. Serial No. 657,335. (No model.)

*To all whom it may concern:*

Be it known that I, EDMUND P. BODEN, a citizen of the United States, residing at Santa Clara, county of Santa Clara, State of California, have invented an Improvement in Tree and Vine Pullers; and I hereby declare the following to be a full, clear, and exact description of the same.

My invention relates to an apparatus which is especially designed to pull small trees, vines, bushes, &c., from the ground.

It consists, essentially, of a four-wheeled vehicle the front and rear wheels of which are situated at a considerable distance apart, an inclined framework extending between the two and having a track or runway from one end to the other, and a truck adapted to travel upon the track having a chain or means to connect it with the tree or vine to be pulled when the truck is at the lower end of the runway. When the wagon is drawn ahead, the truck runs up the inclined plane of the framework and thus acts to pull the tree or vine.

It also consists in details of construction, all of which will be more fully explained by reference to the accompanying drawings, in which—

Figure 1:
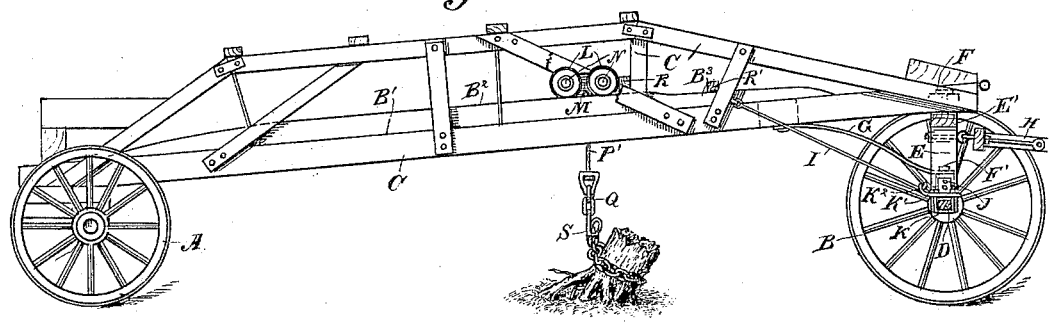
Figure 2:
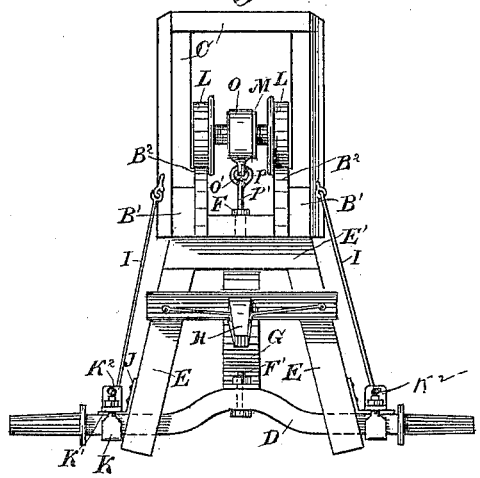
Figure 3:
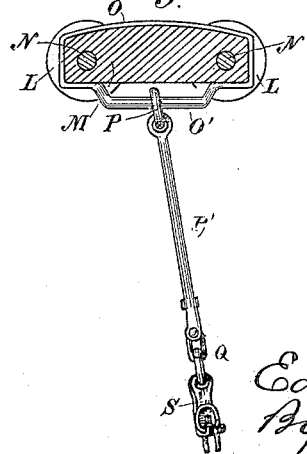

Figure 1 is a side view of my apparatus. Fig. 2 is a rear view of the same. Fig. 3 is a view of the truck and connections.

The object of this invention is to provide a simple inexpensive apparatus with a powerful leverage by which stumps of all small trees—such as fruit-trees, vines, and bushes—which have been cut down may be removed with ease and rapidity.

A are the front and B the rear wheels of my apparatus. From the front to the rear wheels extends a stout truss-framework C, the front end of which is supported close to the front axle, which may be approximately straight or of any desired form for the purpose. A pole and suitable connections for a team or other means for hauling a machine are also connected with the front end of the vehicle.

The rear axle D is arched to any desired height in the center, and from each side the frame or truss timbers E extend upwardly, converging slightly and having a cross beam or timber E' uniting the upper ends. This truss forms a support for the rear ends of the frame-timbers B' and raises them to a considerable height above the level of the front ends, so that from the front to the rear wheel is formed an inclined plane of any desired length and gradient. The rear end of the frame B' is connected with the top bar E' of the truss by a king-bolt F, which forms a swivel and allows the frame to be turned about it.

From the center of the bent axle D extends a brace-bar G, the front end of which is fixed to the framework B', while the rear end is turnable about a king bolt or pin F', which connects the axle D in line beneath the king-bolt F. This provides for the turning of the rear axle, which may in some cases be necessary for the purpose of properly steering the machine and turning it where there is but little room for the purpose. The turning of this rear axle is effected by means of a pole H, which extends out rearwardly from it.

When the vehicle is to travel in straight lines and no steering is to be done with the rear wheels, they are held in place by brace-rods I, extending from the rear axle to the frame B', as shown.

The beams E of the truss-frame are fitted upon the ends of the axle D outside of the curve by being notched or cut away, as shown, and an angle-plate J is fixed to each of these beams, extending also along the axle D, where it is secured by means of a clip K, with nuts upon the upper end, and a clip-plate K', through which the screw-threaded ends of the clip pass to receive the nuts. The ends of these plates K' upon each side extend a short distance beyond the clip K and have holes $K^2$ made in them, which serve as attachments for the rods I, the latter being hooked or otherwise connected with them when they are used, and they are thus easily disengaged when the rear wheels are to be turned for steering or other purposes. The beams or timbers B' have a general inclination, rising from the front to the rear, as before described. At the extreme front the inclination is made sharper, having a considerable pitch downward, this portion of the inclination extending two and one-half or three feet or more.

Upon the top of this framework B' are fixed rails B², which are adapted to receive the wheels L of the truck which travels upon these rails.

The body of the truck consists of a block M, and the axles N pass through the ends of this truck-body and carry the wheels L upon their outer ends, as before stated. Around the block or body M extends a strong wide strap O, of metal, which serves to partly bind it together, but at the lower side the strap is bent so that a portion of it stands away from the body of the block N and essentially parallel with its lower face, as shown at O'. This portion is also rounded or slotted and serves to receive the sliding traveler P, which is movable from one end to the other of this part O'. From this traveler a link P' extends, and with it is connected the chain Q, which serves to attach to the stem or vine to be pulled.

The operation of the machine will then be as follows: The truck M is first brought to the front portion of the machine and upon the lowest portion of the inclined track B'. A chain is then fixed about the stump to be pulled by means of a claw-hook S, and the wagon is moved ahead. The first action will be to cause the truck M to move up the sharp incline at the front end of the framework until the slack of the chain is taken up. As the wagon continues to move forward the truck moves up the inclined track B', and the tension thus caused will pull the stump out of the ground or loosen it very materially. When the truck reaches a point near the end of the track B', it will come in contact with a stop R, which is fixed across the framework B, and if the stem is sufficiently loosened the slight pull caused by the further travel of the machine will drag the stump from the ground. If at this point a considerable strain is brought upon the chain, the traveler P will slide to the rear end of the guide O', thus transferring the pull to the rear part of the truck, and this prevents the latter from being tilted up when it strikes the stop R. If, however, the stump is not entirely free at this time, the stop R can be removed and the wheels of the truck will pass on up the remainder of the inclined portion of the track B³, and by continued forward motion of the machine the truck will continue its travel until it strikes a second stop R', and this will usually suffice to remove the stump.

Having thus described my invention, what I claim as new, and desire to secure by Letters Patent, is—

1. A device for pulling stumps consisting of an inclined plane mounted upon a vehicle adapted to be moved over the ground, an inclined track carried by said plane, a truck movable upon said track and means for connecting the truck with the stump.

2. A device for extracting stumps consisting of an inclined plane rising from front toward the rear wheels upon which said framework is mounted by which it is adapted to be moved over the ground, a track carried upon the inclined framework and having the front inclined downwardly at a sharper angle than the main portion, a wheeled truck adapted to travel upon guide-rails upon the inclined framework, a connecting device between the truck and the stump whereby the connection may be made when the truck is at its lowest point, said connecting device being extended while the truck is moving up the steep incline at the front, and the stump extracted by the continued movement of the truck up the main incline as the vehicle is moved beneath it.

3. A device for pulling stumps consisting of axles and bearing-wheels, a support upon the front axle for the front end of an inclined framework and track, a framework mounted upon the rear axle and forming a support for the rear end of the intermediate framework and track whereby the latter stands at an inclination from the front to the rear end, a king-bolt passing through the upper part of the framework, a brace-rod connecting the axle forwardly with the framework and a second king-bolt in line with the upper one whereby the rear axle is turnable about the pivotal line and brace-rods adapted to connect the axle and the framework when it is desired to retain the axle rigidly in place.

4. In an apparatus of the character described, a wheeled vehicle, an inclined framework and track rising from the front toward the rear, a truck or traveler movable thereon, a chain and connection between the truck and the stump to be pulled, whereby the latter is gradually lifted, and a stop against which the truck strikes at the end of its rearward travel.

5. In an apparatus of the character described, a wheeled vehicle, an inclined framework and track rising from the front toward the rear, a truck or traveler movable thereon, a chain and connection between the truck and the stump to be pulled, whereby the latter is gradually lifted, a removable stop intermediate between the ends of the incline, and a supplemental stop at the rear end thereof.

In witness whereof I have hereunto set my hand.

EDMUND P. BODEN.

Witnesses:
S. H. NOURSE,
JESSIE C. BRODIE.